United States Patent [19]
Rinz

[11] Patent Number: 6,040,391
[45] Date of Patent: Mar. 21, 2000

[54] PROCESS FOR THICKENING THERMOSET RESIN MOLDING COMPOUND COMPOSITIONS

[75] Inventor: James E. Rinz, University Heights, Ohio

[73] Assignee: Premix, Inc., North Kingsville, Ohio

[21] Appl. No.: 09/141,931

[22] Filed: Aug. 28, 1998

Related U.S. Application Data

[63] Continuation of application No. 08/769,454, Dec. 18, 1996, Pat. No. 5,854,317.
[60] Provisional application No. 60/010,601, Feb. 2, 1996.

[51] Int. Cl.⁷ .............................. C08C 19/22; C08F 8/32; C08L 63/00
[52] U.S. Cl. .................. 525/375; 525/327.3; 525/327.6; 525/329.9; 523/414; 523/430
[58] Field of Search ................. 525/375, 327.3, 525/327.6, 329.9; 523/414

[56] References Cited

U.S. PATENT DOCUMENTS

| | | |
|---|---|---|
| 3,567,494 | 3/1971 | Fitko ..................................... 117/93.31 |
| 3,673,140 | 6/1972 | Ackerman et al. .................. 260/22 TN |
| 3,700,643 | 10/1972 | Smith et al. ..................... 260/77.5 AN |
| 3,935,173 | 1/1976 | Ogasawara et al. ................ 260/78.5 E |
| 4,451,610 | 5/1984 | Collister .................................... 525/19 |
| 4,613,543 | 9/1986 | Dabi ....................................... 428/304.4 |
| 4,675,232 | 6/1987 | Edenbaum et al. .................. 428/317.3 |
| 4,788,108 | 11/1988 | Saunders, Jr. et al. ................. 428/481 |
| 4,939,008 | 7/1990 | Kemski ................................... 428/34.3 |
| 5,091,239 | 2/1992 | Przeworski et al. .................... 428/195 |
| 5,194,418 | 3/1993 | Miyauchi et al. ....................... 503/226 |
| 5,366,572 | 11/1994 | Hamilton et al. ...................... 149/19.9 |
| 5,439,969 | 8/1995 | Sanduja et al. .......................... 524/534 |
| 5,486,576 | 1/1996 | Larson et al. ............................ 525/375 |
| 5,574,083 | 11/1996 | Brown et al. ............................ 524/186 |

FOREIGN PATENT DOCUMENTS

| | | |
|---|---|---|
| 143917 | 9/1980 | Germany . |

OTHER PUBLICATIONS

PCT Search Report for PCT Application No. PCT/US97/00971 dated May 12, 1997.
"Composites, Fabrication to Die Design", Encyclopedia of Polymer Science and Engineering, vol. 4 (1986), pp. 1–37.
"Polyesters to Polypeptide Synthesis", Encyclopedia of Polymer Science and Engineering, vol. 12 (1988), pp. 283–289.
Technical Information Sheet for Crosslinker CX–100 by Zeneca Resins dated Nov. 1993 (6 pages).
Eslinger, Delano R. "Aliphatic Epoxy Emulsion Crosslinker for Waterborne Coatings", Journal of Coatings Technology, vol. 67, No. 850 (Nov. 1995), pp. 45–50.
Ionac PFAZ–322 by Sybron Chemicals Inc dated Nov. 1993 (2 pages).
"Composites", Engineered Materials Handbook, vol. 1 (1987).

*Primary Examiner*—Tae Yoon
*Attorney, Agent, or Firm*—Renner, Otto, Boissella & Sklar

[57] ABSTRACT

This invention relates to a process for making a thickened thermoset resin composition, comprising: mixing (A) a carboxylic acid containing thermoset resin composition; and
(B) at least one compound represented by the formula

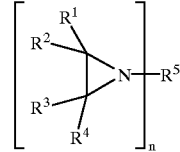

(B-I)

wherein in Formula (B-I): $R^1$, $R^2$, $R^3$ and $R^4$ are independently hydrogen or methyl; $R^5$ is hydrogen, a hydrocarbon group or a substituted hydrocarbon group, the substituents on said substituted hydrocarbon group comprising oxygen and/or nitrogen; and n is at least 1.

17 Claims, 1 Drawing Sheet

PROCESS FOR THICKENING THERMOSET RESIN MOLDING COMPOUND COMPOSITIONS

RELATED U.S. APPLICATION DATA

This application is a continuation of application Ser. No. 08/769,454 filed on Dec. 18, 1996, now U.S. Pat. No. 5,854,317 which claims priority to provisional application Ser. No. 60/010,601 filed on Feb. 2, 1996.

TECHNICAL FIELD

This invention relates to a process for thickening thermoset resin molding compound compositions. More particularly, this invention relates to a process for thickening thermoset resin molding compound compositions using an aziridine thickening agent.

BACKGROUND OF THE INVENTION

There are a number of known methods for thickening thermoset polyester resin compositions. One of these methods involves the use of inorganic oxides, such as magnesium oxide, to thicken unsaturated polyester resins blended with styrene. Another method involves the coreaction of polyisocyanates with hydroxyl groups contained within the polyester resin or added as a coreactant to form urethane linkages. A third method involves the trimerization of polyisocyanates with the use of a catalyst. A problem with the metal oxide or hydroxide prior art methods is that an inherently stable viscosity plateau is not achieved, and the molding compounds thickened by these techniques have relatively short shelf lives and do not remain soft and pliable for sufficiently long periods of time. A problem with polyisocyanate prior art methods is that the polyisocyanates are sensitive to water and to acid functional groups found in the molecular structures of many resins. These problems are overcome by the present invention which involves the use of an aziridine compound as a thickening agent.

SUMMARY OF THE INVENTION

This invention relates to a process for making a thickened thermoset resin composition comprising, mixing:

(A) a carboxylic acid and optionally amine acceptor containing thermoset resin composition; and (B) at least one compound represented by the formula (B-I)

wherein in Formula (B-I): $R^1$, $R^2$, $R^3$ and $R^4$ are independently hydrogen or methyl; $R^5$ is hydrogen, a hydrocarbon group or a substituted hydrocarbon group, the substituents on said substituted hydrocarbon group comprising oxygen and/or nitrogen; and n is at least 1. This process is useful in making improved sheet molding compounds, bulk molding compounds, thick molding compounds, and the like.

DESCRIPTION OF THE PREFERRED EMBODIMENTS

The thermoset resin composition (A) may comprise: (i) an acid functionalized thermoset resin containing at least one carboxylic acid group in its molecular structure; (ii) a mixture of a thermoset resin, and at least one carboxylic acid; or (iii) a mixture of an acid functionalized thermoset resin containing at least one carboxylic acid group in its molecular structure, and at least one carboxylic acid.

The carboxylic acid group may be derived from an anhydride group. For example, anhydride groups may be hydrolyzed to form acid groups. The thermoset resin composition (A) may optionally comprise an amine acceptor group. An amine acceptor group is a functional group capable of being reactive with an amine, especially a secondary amine. Examples of the amine acceptor group include anhydride groups, epoxy groups and isocyanate groups. If an anhydride group is present, and if it remains unconverted, then it may act as an amine acceptor group.

In one embodiment, the carboxylic acid in (ii) or (iii) is an oligomer or a polymer having at least one carboxylic acid group in its molecular structure. The thermoset resin can be any thermoset resin, examples of which include unsaturated polyesters, vinyl esters, isocyanurate vinyl esters, epoxies, poly(ester-imides), bisphenol A fumaric types, cyanate esters, epoxy vinyl esters, phenolics, acrylics, and mixtures of two or more thereof. In one embodiment, the acid functionalized resin is an unsaturatd polyester, poly(ester-imide), novolac vinyl ester, or mixture of two or more thereof.

The unsaturated polyesters are condensation polymers made by the condensation of unsaturated polybasic acids and anhydrides, such as dibasic acids or anhydrides, with polyols, such as dihydroxy or trihydroxy compounds. The polyesters may include in the polymeric chain, varying proportions of other saturated or aromatic dibasic acids and anhydrides which are not subject to crosslinking. The particular non-crosslinking components and their properties will depend upon the desired properties of the final products.

Examples of unsaturated polybasic acids or anhydrides which are utilized in the formation of the polyester resins include maleic acid, fumaric acid, itaconic acid, tetrahydrophthalic acid, or the anhydrides of any of the foregoing. Examples of saturated aliphatic polycarboxylic acids include adipic and succinic acids, and examples of aromatic polycarboxylic acids include phthalic acid, isophthalic acid, terephthalic acid and halogenated derivatives such as tetrachlorophthalic acid and anhydride.

Examples of polyols include dihydroxy and trihydroxy compounds which in turn include ethylene glycol, propylene glycol, 1,2-butanediol, 1,3-butanediol, 1,4-butanediol, diethylene glycol, dipropylene glycol, glycerol, neopentyl glycol, and reaction products of alkylene oxides with, for example, 2,2'-bis(4-hydroxy phenylene)propane, (Bisphenol A).

The polyesters are prepared by reacting the one or more polybasic acids or anhydrides with the polyols (di- or tri-hydroxy compounds) in approximately equal proportions. Examples of such polyesters include: maleic anhydride and propylene glycol (1:1 molar ratio); isophthalic acid, maleic anhydride and propylene glycol (1:2:3 and 1:1:2 molar ratios); and adipic acid, maleic anhydride and propylene glycol (1:2:3 molar ratio). The degree of polymerization of polyester resins is conveniently measured with respect to the acid end groups on a solids basis or dissolved in styrene. One gram of the polyester resin is titrated with potassium hydroxide, and the number of milligrams of potassium hydroxide necessary to neutralize the gram of polyester is called the acid number. In one embodiment of this invention, the acid number of the polyester resin in styrene solution is from about 2 to about 50, and in one embodiment about 12 to about 24.

A wide variety of unsaturated polyester resins can be used. These include the polyester resin-styrene monomer solutions marketed by: Aristech Chemical Corporation under the trade designations MR, LB, LAM, P, and E, specific examples being MR 13038 which is identified as an unsaturated polyester resin-styrene monomer solution having a styrene monomer content of about 30%, MR 13017 which is identified as an isophthalate type unsaturated polyester resin-styrene monomer solution having a styrene monomer content of about 32.5%, and MR 14017 which is identified as an isophthalate type unsaturated polyester resin-styrene monomer solution having a styrene monomer content of about 31.5%; and DSM Resins under the trade designation Daron XP 21-102 which is identified as a polyester-imide dissolved in styrene monomer, the styrene monomer content of about 32–34% by weight.

The acid-functionalized unsaturated polyester resins that can be used include: Polylite 31-610-00, a product of Reichhold identified as a propylene glycol-isophthalate, maleate type unsaturated polyester dissolved in styrene monomer, the styrene monomer content being a maximum of about 32% by weight; Polylite 31-615-20, a product of Reichhold identified as propylene glycol-maleate type unsaturated polyester resin dissolved in styrene monomer, the styrene monomer content being a maximum of about 35% by weight; E-903, a product of Alpha Owens Corning identified as a dicyclopentadiene modified propylene glycol-maleate type unsaturated polyester dissolved in styrene monomer, the styrene monomer content of about 26.5–31.5% by weight; and E-4381, a product of Alpha Owens Corning identified as a modified polyester resin dissolved in styrene monomer, the styrene monomer maximum content of about 37% by weight.

The isocyanurate vinyl ester resins that can be used include Atlac® ITP® 31-632-00, a product of Reichhold identified as an isocyanurate vinyl ester resin dissolved in styrene monomer, the styrene monomer content of about 47–52% by weight; and 7568-44-3, a product of Reichhold identified as an isocyanurate vinyl ester containing a proprietary polyol and being dissolved in styrene monomer, the styrene monomer content being a maximum of 35% by weight.

Bisphenol A fumaric type resins useful include Atlac® 382-ES, a product of Reichhold, identified as a solid propoxylated bisphenol A fumaric polyester resin; and Atlac® 382-ES HMW, a product of Reichhold, also identified as a solid propoxylated bisphenol A fumaric polyester resin.

The cyanate ester resins that are useful include AroCy L-10, a product of Ciba Geigy identified as a bisphenol E dicyanate ester.

The epoxy resins that are useful include Epon 828, a product of Shell identified as a bisphenol A epoxy resin.

The vinyl ester resins that can be used are the reaction products of epoxy resins and monofunctional ethylenically unsaturated carboxylic acids. They may be represented by the formula where $R^1$ is H or $CH_3$, and $R^2$ is an epoxy resin, examples of the latter including epoxylated bisphenol A-epichlorohydrin and epoxylated phenolformaldehyde novolac. These resins can be made by reacting an epoxy resin with an ethylenically unsaturated carboxylic acid. The epoxy resins that can be used include diglycidyl ether of bisphenol A and higher homologues thereof, the diglycidyl ether of tetrabromobisphenol A, epoxylated phenolformaldehyde novolac, and polypropylene oxide diepoxide. The acids that can be used include acrylic and methacrylic acid. The acid-epoxide reaction can be catalyzed by tertiary amines, phosphines, alkalis, or onium salts. Examples of commercially available vinyl ester resins that can be used include Derakane 780, a product of Dow identified as a solution of an acid functionalized novolac vinyl ester resin dissolved in styrene monomer, the styrene monomer content being about 30–40% by weight and Derakane 470-36, a product of Dow identified as an epoxy novolac vinyl ester resin dissolved in styrene monomer, the styrene monomer content of about 36% by weight. The epoxy vinyl esters that can be used include Derakane 411-45, a product of Dow identified as a solution of an epoxy vinyl ester resin dissolved in monomeric styrene, the content of the monomeric styrene of about 45% by weight.

The carboxylic acid or anhydride can be any organic carboxylic acid or anhydride. Examples include acrylic acid, methacrylic acid, maleic acid or anhydride, succinic anhydride, fumaric acid, phthalic acid or anhydride, isophthalic acid, terephthalic acid, adipic acid, polyadipic anhydride, fatty acids, and mixtures of two or more thereof.

The carboxylic acid or anhydride containing oligomer or polymer can be any oligomeric or polymeric material having in its molecular structure at least one carboxylic acid or anhydride group. Examples of the oligomers and polymers that can be used include polybutadiene, copolymers of butadiene and acrylonitrile, styrene maleic anhydride copolymers and various olefin maleic anhydride copolymers. Examples of commercially available materials that can be used include: the carboxyl terminated butadiene acrylonitrile liquid copolymers supplied by BFGoodrich under the tradename Hycar, specific examples including Hycar 1300X8, Hycar 1300X9, Hycar 1300X13, Hycar 1300X18, and Hycar 1300X31; and the polybutadiene polymers adducted with maleic anhydride supplied by Ricon Resins under the trade designations Ricon 131/MA-5, Ricon 131/MA-10, Ricon 131/MA-12 and Ricon 131/MA-17. An example of a commercially available carboxyl terminated polybutadiene is Hycar 2000X162 supplied by BFGoodrich.

Isocyanate group containing compounds useful as an amine acceptor group include PCA 6-3, a product of Polyurethane Specialties identified as an MDI based polyether prepolymer.

The compounds (B) can be any aziridine compound represented by the formula wherein in Formula (B-I): $R^1$, $R^2$, $R^3$ and $R^4$ are independently hydrogen or methyl; $R^5$ is hydrogen, a hydrocarbon group or a substituted hydrocarbon group, the substituents on the hydrocarbon groups comprising oxygen and/or nitrogen atoms; and n is at least 1, and in one embodiment n is in the range of 2 to about 4, and in one embodiment 2 to about 3, and in one embodiment 3 to about 4. In one embodiment, $R^1$, $R^2$, $R^3$ and $R^4$ are each hydrogen. In one embodiment, $R^1$ is methyl, and $R^2$, $R^3$ and $R^4$ are hydrogen. $R^5$ can have from about 1 to about 10,000 carbon atoms, and in one embodiment from about 1 to about 500 carbon atoms. In one embodiment, these compounds are represented by the formula wherein in Formula (B-II): $R^1$ is an alkylene group, which in one embodiment contains 1 to about 10 carbon atoms; $R^2$ is a hydrocarbyl group or a substituted hydrocarbyl group, which in one embodiment contains 1 to about 10,000 carbon atoms, and in one embodiment, 1 to about 500; and $R^5$ is a hydrogen or methyl group. In one embodiment, these compounds are represented by the formula wherein in Formula (B-III): $R^1$ and $R^2$ are alkylene groups, which in one embodiment contains 1 to about 10 carbon atoms; $R^3$ is hydrogen, a hydrocarbyl group or a substituted hydrocarbyl group, which in one embodiment contains 1 to about 500 carbon atoms, and in one embodiment 1 to about 50 carbon atoms; and n is a number in the range of 1 to 4; and $R^5$ is a hydrogen or methyl group. In one embodiment, these compounds are represented by the formula wherein in Formula (B-IV) $R^1$ is —$C_2H_5$ or —$CH_2OH$ and $R^5$ is a hydrogen or methyl group. Examples of aziridines compounds that can be used include the polyfunctional aziridines supplied by EIT, Inc. under the trade designation XAMA, including XAMA-2, which is identified as trimethylol propane-tris (beta-(N-aziridinyl) proprionate), and XAMA-7, which is identified as pentaerythritol-tris-(beta-(aziridinyl) propionate); under the trade designation Ionac® including PFAZ-322, a product of Sybron Chemicals, identified as a trifunctional aziridine; and including CX-100, a product of Zeneca Resins, identified as a polyfunctional aziridine.

In the formulae above, in preferred embodiments, n is at least 2 when an amine acceptor is not used. In another preferred embodiment, n is at least 1 when an amine acceptor is used, especially when the amine acceptor has a functionality of at least 2. In another preferred embodiment, n plus the number of the amine acceptor functionality is at least about 2 and more preferably at least about 3.

The molar ratio of carboxylic acid group in the resin composition (A) to aziridine groups (i.e., N—) in (B) is generally from about 0.05 to about 20, and in one embodiment about 0.25 to about 4. In a preferred embodiment, the molar ratio of carboxylic acid group in the resin composition (A) to aziridine groups in (B) is at least about 0.5 to about 1.

In one embodiment, a supplemental thickening agent (C) is used in combination with the aziridine (B). This supplemental thickening agent can be an inorganic metal oxide or hydroxide, the metal being selected from the group consisting of Mg, Ca, Zn, and mixtures of two or more thereof. In preferred embodiments, Mg, Ca, and Zn oxides and Mg and Ca hydroxides are used. In one embodiment, the ratio of aziridine groups (i.e., N—) in (B) to metal atoms in (C) is from about 0.01 to about 100, and in one embodiment about 0.1 to about 10. Specific examples include PG-9033, a product of Plasticolors, which is identified as a MgO dispersion and PG-91146, also a product of Plasticolors, which is identified as a $Mg(OH)_2$ dispersion.

In one embodiment, the resin composition (A) includes a free radical initiator capable of generating free radicals that can initiate crosslinking between the thermoset resin but does not cause any significant crosslinking at low temperatures. In other words, the polymerization initiators must be such that they are sufficiently stable at the temperatures at which the resin compositions are formed so that they do not prematurely crosslink and become thermoset. In one embodiment, the polymerization initiators are chosen from materials which contain either a peroxide group or an azo group. Examples of useful peroxide compounds include t-butyl perbenzoate, t-butyl peroctoate, benzoyl peroxide, t-butyl hydroperoxide, succinic acid peroxide, cumene hydroperoxide and dibenzoyl peroxide. Examples of useful azo compounds include azobisisobutyronitrile and t-butylazoisobutyronitrile. Examples of commercially available initiators that can be used include: Vazo 64, a product of DuPont identified as azobisisobutyronitrile; Trigonox 29-B75, a product of Akzo identified as a mixture of 1,1-di(tert-butyl peroxy)-3,3,5-trimethylcyclohexane and dibutyl phthalate; and Trigonox C, a product of Akzo identified as tert-butyl peroxybenzoate. Generally, the concentration of initiator in the resin composition (A) is up to about 5% by weight, and in one embodiment from about 0.1% to about 5% by weight, and in one embodiment about 0.2% to about 1 % by weight.

In order to avoid premature polymerization of the polymerizable materials used in the resin composition (A), a small amount of a polymerization inhibitor can be used. Examples of such inhibitors include hydroquinone, tertiary butyl catechol, methyl ether of hydroquinone, and the like. Examples of commercially available inhibitors that can be used are those available from Plasticolors under the trade designations: SP-91029, which is identified as a mixture of 2,6-di-tert-butyl-p-cresol (25%) and vinyl toluene (75%);

SP-9073, which is identified as a mixture of diethylene glycol (85%) and toluhydroquinone (15%); and SP-9139, which is identified as a mixture of dialkyl phthalate (95%) and p-benzoquinone (5%). These inhibitors can be employed in the resin compositions at concentrations up to about 1% by weight, and in one embodiment about 0.01% to about 0.2% by weight.

Wetting agents that can be used include phosphated polyesters. Examples of commercially available wetting agents that can be used include: BYK-W995 and BYK-W996, which are products of BYK-Chemie USA identified as solutions of saturated polyesters with acidic groups. These wetting agents can be employed in the resin compositions at concentrations of up to about 2% by weight, and in one embodiment about 0.5% to about 1% by weight.

Antifoam agents can be used. Typical antifoam agents include the commercially available silicone antifoam agents. Examples of commercially available antifoam agents that can be used include AF9000, a product of General Electric identified as a silicone fluid containing dimethylpolysiloxane. These antifoam agents can be employed in the resin compositions at concentrations of up to about 0.1% by weight, and in one embodiment about 0.001% to about 0.01% by weight.

Other ingredients which may be used include one or more of the following: fillers, fibrous reinforcing materials, pigments, mold release agents and thermoplastic polymeric materials.

Fillers are added as extenders to impart such properties as reduction in shrinkage and tendency to crack during curing. Fillers also tend to improve stiffness and heat resistance in molded articles. Examples of fillers that can be used include alumina trihydrate, calcium carbonate, clays, calcium silicate, silica, talcs, mica, barytes, dolomite, solid or hollow glass spheres of various densities. A commercially available filler that can be used is Camel-Wite, which is a product of Genstar Stone Products Co. identified as limestone dust (calcium carbonate).

The particular filler chosen may be dependent upon the cost of such filler, the effect of the filler on mix viscosity and flow properties, or the effect that the filler has on properties such as shrinkage, surface smoothness, chemical resistance, relative weight, flammability and/or the electrical characteristics of the cured molded article. The amounts of filler that is used may vary up to about 70% by weight, and in one embodiment from about 10% to about 50% by weight. The amount preferred for any particular formulation can be determined readily by one skilled in the art. Useful fillers generally will have an average particle size of from about 0.3 to about 50 microns, and in one embodiment about 1 to about 12 microns.

Fibrous reinforcing materials can be added for the purpose of imparting strength and other desirable physical properties to the cured products formed therefrom. Examples of fibrous reinforcements that can be utilized include glass fibers, asbestos, carbon fibers and polyester fibers, and natural organic fibers such as cotton and sisal. Useful fibrous reinforcements include glass fibers which are available in a variety of forms including, for example, mats of chopped or continuous strands of glass, glass fabrics, chopped glass and chopped glass strands and blends thereof. Preferred fibrous reinforcing materials include 0.5, 1 and 2 inch glass fibers.

The amount of fibrous reinforcing material that is used can be varied over a wide range including amounts of up to about 75% by weight, although smaller amounts will be required if any of the above-described fillers are included in the formulation. The amount of fibrous reinforcing material can vary from about 5% to about 65% by weight, and in one embodiment from about 10% to about 35% by weight. In specific embodiments, the preferable amount of fibrous reinforcing material for BMC materials is from about 10% to about 20% by weight, and the preferable amount of fibrous reinforcing material for SMC materials is from about 20% to about 35% by weight. The amount of fibrous reinforcing material to be utilized in any particular formulation depends upon the desired end use and can be determined readily by one skilled in the art.

Mold release agents also can be included and these are typically zinc, calcium, magnesium or lithium salts of fatty acids. Specific examples of mold release agents include zinc stearate, calcium stearate, magnesium stearate, lithium stearate, calcium oleate, zinc palmitate, etc. A commercially available mold release agent that can be used is Synpro Zinc Stearate Type ABG, which is a product of Synthetic Products Co. identified as zinc stearate. These mold release agents can be included in the inventive compositions at concentrations of up to about 5% by weight, and in one embodiment from about 1% to about 2% by weight.

Pigments also can be included in the inventive compositions. Typical examples of pigments include carbon blacks, iron oxides, titanium dioxide and phthalocyanines. The pigment can be dispersed into the inventive compositions as dry pigment powders or pre-dispersed forms in non-reactive carriers.

Thermoplastic polymeric materials which reduce the shrinkage of the inventive compositions during molding can also be included. These thermoplastic materials can be used to produce molded articles having surfaces of improved smoothness. Examples of useful thermoplastic polymers include homopolymers of ethylene, styrene, vinyl toluene, vinyl acetate, alkyl methacrylates and alkyl acrylates. Additional examples of thermoplastic polymers are copolymers of: vinyl chloride and vinyl acetate; vinyl acetate and acrylic or methacrylic acid; styrene and acrylonitrile; methyl methacrylate and alkyl esters of acrylic acid; methyl methacrylate and styrene; and methyl methacrylate and acrylamide. An additional example is polyurethane. Examples of commercially available polymers that can be used include: Neulon Polyester Modifier T-Plus, a product of Union Carbide identified as polyvinyl acetate-ester epoxide polymer dissolved in styrene monomer; LP-40A, a product of Union Carbide identified as a polyvinyl acetate copolymer dissolved in styrene monomer; LP-90, a product of Union Carbide identified as a polyvinyl acetate dissolved in styrene monomer; Kraton G1701, a product of Shell identified as a styrene-ethylene/propylene diblock and/or block copolymer; Finaprene 401, a product of Fina Oil and Chemical Company identified as a styrene/butadiene/styrene block copolymer; RP-700, a product of Owens Corning identified as a polymethyl methacrylate; MD-9520, a product of Chevron identified as polystyrene; and Uralloy LP-2035, a product of Ashland Chemical identified as a styrene solution of polyurethane. Up to about 15% by weight of a thermoplastic polymer can be included in the resin compositions.

The thermoset compositions of the invention are made by first preparing a composition comprising all of the ingredients for the composition, but for the fillers, fibrous reinforcing materials and the aziridine (B) and any supplemental thickening agent (C) that is to be used. This composition is prepared by first blending together the thermoset resin composition (A), and any polymerization initiators accelerators, inhibitors, mold release agents, pigments or thermoplastic polymeric materials that may be desired, using a high shear mixer. Any filler material that is to be used is then added, and the high shear mixing is continued until an adequate dispersion of all of the filler is achieved. The aziridine (B) and, if used, supplemental thickening agent (C) is then added and the mixture is mixed to form a thermoset resin paste composition. In one embodiment, the paste is then combined with any fibrous reinforcing materials that are to be used using a sheet molding compound machine of the type illustrated in FIG. 1 to form a sheet molding compound, or using a mixer to produce a bulk molding compound.

High shear mixers that can be used include Banbury mixers, cowels disperser, two roll mills, high shear compound screw extruders and similar mixers. Generally, this type of mixing results in a significant increase in the temperature of the material being mixed, and this temperature must be maintained below the critical temperatures which would result in decomposition of the polymerization initiators which would cause premature polymerization of the inventive compositions.

Figure 1:
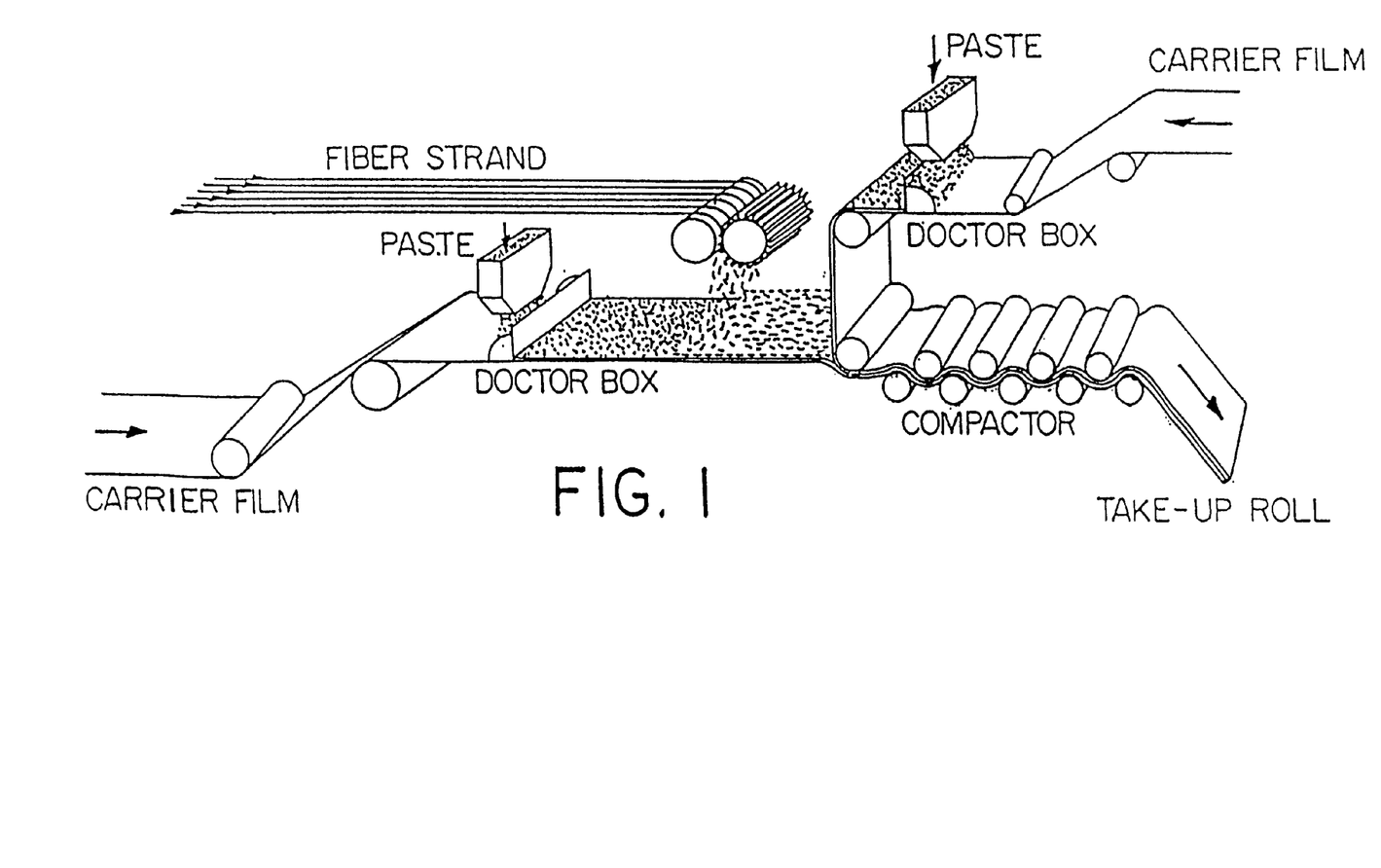
FIG. 1 is a schematic representation of a sheet molding compound machine for making sheet molding compounds using thickened thermoset resin compositions made by the inventive process.

Sheet molding compounds are made using, for example, a sheet molding compound machine of the type illustrated in FIG. 1. Referring to FIG. 1, the sheet molding paste-like composition ("paste") is fed to the two doctor boxes. A carrier film, which can be, for example, polyethylene, nylon, and the like, is advanced past each doctor box on a conveyor belt, and a layer of paste is deposited on each carrier film. Chopped fiber strand (e.g., fiberglass) is deposited onto one layer of paste, and the other layer of paste is placed over the first layer to form a composite structure comprising the two carrier films on the outside and the paste and chopped fiber strand sandwiched in between. The composite structure is advanced through a compactor comprising a series of reduction rollers to form the inventive sheet molding compound which, in one embodiment, is in the form of a compact flat reinforced resin sheet.

The following examples illustrate the invention. Unless otherwise indicated, in the following examples as well as throughout the entire specification and in the appended claims, all parts and percentages are by weight, and all temperatures are in degrees Celsius.

EXAMPLES

Examples 1–39 and 46–54 are examples of sheet molding compounds within the scope of the invention. Examples 40–45 are examples of bulk molding compounds within the scope of the invention. These compounds are prepared using the components listed in the following Tables I-XIII by first adding all of the components except the fillers, glass fibers and the aziridine compound and supplemental thickening agents, if any, to a vessel in the order listed, then blending the resulting mixture with a high shear cowles blade mixer until the mixture is mixed. The fillers and/or glass fibers are added and the composition is mixed until the temperature increases to 80° F.–115° F. The aziridine compound and supplemental thickening agents, if any, are added, and the mixture is mixed for one minute, the resulting product being a paste-like composition. The paste is placed in the doctor boxes of a sheet molding compound machine of the type illustrated in FIG. 1 to be spread on a carrier film to produce sheet molding compounds (Examples 1–39 and 46–54), or the paste is combined with the glass fibers in a mixer to produce bulk molding compounds (Examples 40–45). Samples of the molding compounds are taken and these samples are tested for various properties such as apparent viscosity as a function of shear rate with the results being indicated in the tables.

Apparent viscosity data is generated using the Premix Processability Tester, Model PPT 1000, which evaluates squeeze flow characteristics of the molding compounds. This apparatus is a rheological instrument designed for testing sheet molding compound samples in a compression molding geometry at compression molding shear rates. The basic components of the apparatus include a load cell, a one piece cross head, hydraulic pump unit, heated platens, hardware controller and a personal computer. The tests consist of monitoring the stress as the sample is squeezed between the two platens. The load cell is located above the stationary upper platen while the lower platen moves toward it at a controlled constant velocity to a predetermined percent strain. At that point the piston is instantaneously stopped and held at a constant displacement while stress relaxation occurs. The raw data is separated into two parts representing stress build and stress relaxation. There are three regions or stages of interest in the stress build part. The first stage, where stress build is slow, is due to compaction of the material. The second stage, where stress rises quickly, is due to transient material deformation. The third stage, which follows a yield, is the steady state flow region from which apparent viscosities can be calculated.

The samples are tested using the PPT 1000 tester at 70° F. The controller and computer are turned on and the following test parameters are set:
(a) closure speed: 2 mm/sec.
(b) 0% precompression
(c) 100 KN full scale Four plies of the 3.5-inch squares are placed between the platens, and the tests are conducted in triplicate to produce the averaged results indicated in the tables.

Mechanical properties were obtained from samples aged five days and weighing between about 500 and 650 grams. Compounds were placed in a mold at 300° F. for 2 minutes at 1,000 psi, although these parameters are not limiting in any way. The same parameters are used in the examples in order to evaluate the effects of different components on the properties of the resultant products. Tensile properties were obtained according to ASTM procedure D-638 and flexural properties were obtained according to ASTM procedure D-790.

The tables represent various examples of the present invention in addition to a number of comparative examples which do not contain an aziridine compound. Various properties are reported in the tables. Blanks indicate that data is unavailable.

Tables 1 and 2 illustrate various embodiments of the present invention.

Table 3 illustrates a low 10 minute paste viscosity obtainable by the present invention. A low paste viscosity promotes glass wet-out.

Table 4 illustrates the ability to rapidly attain a stable plateau viscosity. Practically no apparent viscosity change is observable over a 2 to 30 day period. A rapidly attained stable plateau viscosity contributes to an extended window for compound molding. The comparative examples show a rise in apparent viscosity over time.

Tables 5 and 6 generally illustrate the use of various polyester resins as component (A).

Table 7 illustrates the use of acid-containing and other coreactants for component (A).

Table 8 illustrates the use of non-acid, isocyanurate resins with acid functionalized resins and/or other co-reactants for component (A).

Table 9 illustrates the use of vinyl ester and bisphenol A fumarate resin systems for component (A).

Table 10 illustrates the present invention using higher glass content.

Table 11 illustrates the suitability of the present invention for bulk molding compounds.

Table 12 illustrates the properties obtainable when using a supplemental thickening agent. The examples according to the present invention show both improved mechanical and shrinkage properties.

Table 13 illustrates examples of resin systems having good gel formation characteristics wherein acid containing reactants are used for component (A).

TABLE I

| | Example | | |
|---|---|---|---|
| | 1 | 2 | 3 |
| Reichhold 31615-20 | 100.00 | | |
| Owens Corning E-903-1 | | 100.00 | |
| Reichhold 31610 | | | 100.00 |
| Styrene Monomer | | | 10.00 |

TABLE I-continued

| | Example | | |
|---|---|---|---|
| | 1 | 2 | 3 |
| BYK Chemie W-996 | 2.50 | 2.50 | 2.50 |
| General Electric AF-9000 | 0.02 | 0.02 | 0.02 |
| Trigonox C | 1.25 | 1.25 | 1.25 |
| Plasticolors SP-9073 | 0.20 | 0.20 | 0.20 |
| Zinc Stearate | 5.00 | 5.00 | 5.00 |
| Camelwite | 175.00 | 175.00 | 175.00 |
| XAMA-7 | 4.50 | 5.00 | 4.75 |
| 1" Glass Fibers | 91.10 | 91.25 | 94.33 |
| SMC Apparent Viscosity ($10^6$ cP) (at log shear rate of 1.5 (1/sec)) | | | |
| at 2 days | 321 | 405 | 454 |
| at 14 days | 320 | 434 | 475 |
| at 58 days | 289 | 405 | 468 |
| at 105 days | 338 | 464 | 447 |

TABLE II

| | Example | | | | | | |
|---|---|---|---|---|---|---|---|
| | 4 | 5 | 6 | 7 | 8 | 9 | 10 |
| Reichhold 31632 | 100.00 | 60.00 | 100.00 | 100.00 | | | |
| Reichhold 31615-20 | | 40.00 | | | 60.00 | | |
| Reichhold 31610 | | | | | | 100.00 | |
| Dow Derakane 411-45 | | | | | | | 70.00 |
| Dow Derakane 780 | | | | | | | 30.00 |
| Styrene Monomer | 8.00 | 3.00 | | 5.00 | 30.00 | 10.00 | 4.50 |
| BF Goodrich Hycar 1300 X-8 | | | | | | 10.00 | |
| BF Goodrich Hycar 1300 X-13 | 8.00 | | | | | | |
| Ricon Resins 131 MA-17 | | 9.00 | | 15.00 | | | 13.50 |
| Union Carbide Neulon T Plus | | | 40.00 | | | | |
| Poly(Styrene/Ethylene-Propylene) Diblock Copolymer | | | | | | 10.00 | |
| BYK Chemie W-996 | 2.50 | 2.50 | 3.00 | 2.50 | 2.50 | 2.50 | 2.50 |
| General Electric AF-9000 | 0.02 | 0.02 | 0.02 | 0.02 | 0.02 | 0.02 | 0.02 |
| Akzo Trigonox 29-B-75 | 1.00 | 1.00 | 1.00 | 1.00 | | | |
| Plasticolors SP-9139 | 0.25 | 0.25 | 0.25 | 0.25 | | | |
| Trigonox C | | | | | 1.25 | 1.25 | 1.25 |
| Plasticolors SP-9073 | | | | | 0.20 | 0.20 | 0.20 |
| Zinc Stearate | 5.00 | 5.00 | 5.00 | 6.00 | 5.00 | 6.00 | 5.00 |
| Camelwite | 175.00 | 175.00 | 150.00 | 200.00 | 175.00 | 150.00 | 175.00 |
| XAMA-7 | 0.90 | 1.85 | 0.23 | 3.11 | 2.70 | 5.40 | 2.80 |
| 1" Glass Fibers | 94.95 | 93.99 | 94.58 | 105.12 | 90.53 | 90.12 | 96.24 |
| SMC Apparent Viscosity ($10^6$ cP) (at log shear rate of 1.5 (1/sec)) | | | | | | | |
| at 2 days | 35 | 166 | 56 | — | 64 | 263 | — |
| at 6 days | 55 | — | 78 | — | 61 | 264 | — |
| at 14 days | 55 | 244 | 71 | — | 59 | 238 | — |

TABLE III

| | Example | | | | | |
|---|---|---|---|---|---|---|
| | C1 | C2 | 8 | 11 | 12 | 13 |
| Reichhold 31615-20 | 60.00 | 60.00 | 60.00 | 60.00 | 60.00 | 60.00 |
| Styrene Monomer | 30.00 | 30.00 | 30.00 | 30.00 | 30.00 | 30.00 |
| (Styrene/Butadiene/Styrene) Block Copolymer | | 4.00 | | | 4.00 | 4.00 |
| Poly(Styrene/Ethylene-Propylene) Diblock Copolymer | 10.00 | 6.00 | 10.00 | 10.00 | 6.00 | 6.00 |
| BYK Chemie W-996 | 2.50 | 2.50 | 2.50 | 2.50 | 2.50 | 2.50 |
| General Electric AF-9000 | 0.02 | 0.02 | 0.02 | 0.02 | 0.02 | 0.02 |
| Trigonox C | 1.25 | 1.25 | 1.25 | 1.25 | 1.25 | 1.25 |

TABLE III-continued

| | \multicolumn{6}{c}{Example} | | | | | |
|---|---|---|---|---|---|---|
| | C1 | C2 | 8 | 11 | 12 | 13 |
| Plasticolors SP-9073 | 0.20 | 0.20 | 0.20 | 0.20 | 0.20 | 0.20 |
| Zinc Stearate | 5.00 | 5.00 | 5.00 | 5.00 | 5.00 | 5.00 |
| Camelwite | 175.00 | 175.00 | 175.00 | 175.00 | 175.00 | 175.00 |
| XAMA-7 | | | 2.70 | 1.35 | 1.35 | 2.70 |
| Plasticolors PG-9033 | 1.68 | 1.68 | | 0.84 | 0.84 | |
| 1" Glass Fibers | 90.21 | 90.21 | 90.53 | 90.37 | 90.37 | 90.53 |
| Brookfield Paste Viscosity ($10^3$ cP) (TA spindle at 5 or 10 rpm) | | | | | | |
| initial | 19.2 | 22.4 | 16.0 | 20.8 | 25.6 | 27.2 |
| at 10 min | 206.4 | 534.4 | 52.0 | 118.4 | 232.0 | 164.8 |
| SMC Apparent Viscosity ($10^6$ cP) (at log shear rate of 1.5 (1/sec)) | | | | | | |
| at 2 days | 101 | 105 | 64 | 98 | 83 | 113 |

TABLE IV

| Composition | C3 | C4 | 14 | 15 |
|---|---|---|---|---|
| Reichhold 31615-20 | 60.00 | 60.00 | 60.00 | 60.00 |
| Union Carbide Neulon T Plus Modified PVA | 40.00 | | 40.00 | |
| Alpha Owens Corning RP-700 PMMA | | 40.00 | | 40.00 |
| BYK Chemie W-996 | 2.50 | 2.50 | 2.50 | 2.50 |
| General Electric AF-9000 | 0.02 | 0.02 | 0.02 | 0.02 |
| Trigonox C | 1.25 | 1.25 | 1.25 | 1.25 |
| Plasticolors SP-9073 | 0.20 | 0.20 | 0.20 | 0.20 |
| Zinc Stearate | 5.00 | 5.00 | 5.00 | 5.00 |
| Camelwite Calcium Carbonate | 175.00 | 175.00 | 175.00 | 175.00 |
| Plasticolors PG-91146 Mg(OH)$_2$ Dispersion | 3.36 | 3.36 | | |
| XAMA-7 | | | 2.88 | 2.88 |
| 1" Glass Fibers | 90.74 | 90.74 | 90.58 | 90.58 |
| SMC Apparent Viscosity ($10^6$ cP) [at log shear rate = 1.5 (1/sec)] | | | | |
| 2 Days | 49 | 80 | 81 | 120 |
| 6 Days | 71 | 215 | 86 | 119 |
| 14 Days | 117 | 255 | 85 | 127 |
| 30 Days | 137 | 262 | 87 | 120 |

TABLE V

| Composition | 16 | 17 | 18 | 19 | 20 | 21 |
|---|---|---|---|---|---|---|
| Reichhold 31615-20 | 60.00 | | | | | |
| Alpha Owens Corning E-903 | | 60.00 | | | | 60.00 |
| Reichhold 31610 | | | 60.00 | 60.00 | | |
| Alpha Owens Corning E-4381 | | | | | 60.00 | |
| Styrene Monomer | | | 26.00 | 40.00 | 30.00 | 30.00 |
| Union Carbide Neulon T Plus Modified PVA | 40.00 | | | | | |
| Ashland LP-2035 | | 40.00 | | | | |
| Chevron MD-9520 Polystyrene | | | 14.00 | | | |
| Poly(Styrene/Ethylene-Propylene) Diblock Copolymer | | | | 10.00 | 10.00 | 10.00 |
| BYK Chemie W-996 | 2.50 | 3.00 | 2.50 | 2.50 | 2.50 | 3.00 |
| General Electric AF-9000 | 0.02 | 0.02 | 0.02 | 0.02 | 0.02 | 0.02 |
| Trigonox C | 1.25 | 1.25 | 1.25 | 1.25 | 1.25 | 1.25 |
| Plasticolors SP-9073 | 0.20 | 0.20 | 0.20 | 0.20 | 0.20 | 0.20 |
| Zinc Stearate | 5.00 | 5.00 | 5.00 | 5.00 | 5.00 | 5.00 |
| Camelwite | 175.00 | 200.00 | 175.00 | 150.00 | 175.00 | |
| Aluminum Trihydrate | | | | | | 175.00 |
| Plasticolors PG-9033 MgO Dispersion | | 0.84 | 0.87 | | | |
| Plasticolors PG-91146 Mg(OH)$_2$ Dispersion | 1.68 | | | | | |
| XAMA-7 | 1.44 | 1.50 | 1.42 | 2.85 | 2.34 | 3.00 |
| 1" Glass Fibers | 90.66 | 98.47 | 90.40 | 85.84 | 90.41 | 90.78 |
| Tensile Strength (MPa) | 63.1 | 63.7 | 55.6 | 56.1 | 67.9 | 55.7 |
| Tensile Modulus (MPa) | 10,066 | 11,239 | 9,722 | 9,377 | 12,066 | 9,377 |
| Tensile Elongation (%) | 1.40 | 0.90 | 0.90 | 1.00 | 1.00 | 0.80 |
| Flexural Strength (MPa) | 148.9 | 144.8 | 144.5 | 142.8 | 164.7 | 162.0 |
| Flexural Modulus (MPa) | 8,619 | 9,446 | 8,205 | 7,860 | 9,239 | 8,825 |

TABLE V-continued

| Composition | 16 | 17 | 18 | 19 | 20 | 21 |
|---|---|---|---|---|---|---|
| Linear shrinkage (mils/inch) [expansion positive] | 0.17 | −0.25 | −0.25 | −0.17 | 0.50 | −0.58 |

TABLE VI

| Composition | 22 | 23 | 24 | 25 | 26 | 27 | 28 |
|---|---|---|---|---|---|---|---|
| Reichhold 31615-20 | 60.00 | | | 60.00 | 60.00 | | 60.00 |
| Alpha Owens Corning E-903 | | 60.00 | 60.00 | | | 60.00 | |
| Styrene Monomer | 30.00 | 30.00 | | | | | 30.00 |
| Poly(Styrene/Ethylene-Propylene) Diblock Copolymer | 10.00 | 10.00 | | | | | 10.00 |
| Ashland LP-2035 | | | 40.00 | | | | |
| Alpha Owens Corning RP-700 PMMA | | | | 40.00 | | | |
| Union Carbide LP-90 PVA | | | | | 40.00 | 40.00 | |
| BYK Chemie W-996 | 2.50 | 2.50 | 2.50 | 2.50 | 2.50 | 2.50 | 2.50 |
| General Electric AF-9000 | 0.02 | 0.02 | 0.02 | 0.02 | 0.02 | 0.02 | 0.02 |
| Trigonox C | 1.25 | 1.25 | 1.25 | 1.25 | 1.25 | 1.25 | 1.25 |
| Plasticolors SP-9073 | 0.20 | 0.20 | 0.20 | 0.20 | 0.20 | 0.20 | 0.20 |
| Zinc Stearate | 5.00 | 5.00 | 5.00 | 5.00 | 5.00 | 5.00 | 5.00 |
| Camelwite | 175.00 | 200.00 | 200.00 | 175.00 | 175.00 | 200.00 | 175.00 |
| XAMA-2 | 3.20 | 3.40 | 3.40 | 3.20 | 3.20 | 3.40 | |
| PFAZ-322 | | | | | | | 3.50 |
| 1" Glass Fibers | 90.69 | 98.64 | 98.64 | 90.69 | 90.69 | 98.64 | 90.78 |
| Tensile Strength (MPa) | 63.6 | 68.5 | 66.8 | 55.2 | 60.0 | 65.8 | 50.4 |
| Tensile Modulus (MPa) | 11,101 | 10,756 | 11,170 | 8,756 | 9,997 | 11,170 | 8,756 |
| Tensile Elongation (%) | 1.40 | 1.10 | 1.00 | 0.80 | 1.00 | 1.00 | 0.90 |
| Flexural Strength (MPa) | 148.8 | 149.7 | 146.8 | 162.7 | 136.6 | 174.2 | 136.2 |
| Flexural Modulus (MPa) | 8,481 | 8,136 | 8,343 | 10,066 | 7,791 | 9,515 | 8,136 |
| Linear shrinkage (mils/inch) [expansion positive] | −0.42 | −0.50 | −0.42 | −0.25 | 0.00 | −0.08 | 0.00 |

TABLE VII

| Composition | 29 | 30 | 31 | 32 |
|---|---|---|---|---|
| Aristech MR-13017 | 100.00 | 100.00 | 100.00 | |
| Reichhold 31610 | | | | 100.00 |
| Styrene Monomer | 15.00 | 3.33 | 3.33 | 10.00 |
| BF Goodrich Hycar 1300-X8 | 15.00 | | | 10.00 |
| Ricon Resins 131 MA-10 | | 10.00 | | |
| Ricon Resins 131 MA-5 | | | 10.00 | |
| BYK Chemie W-996 | 2.50 | 2.50 | 2.50 | 2.50 |
| General Electric AF-9000 | 0.02 | 0.02 | 0.02 | 0.02 |
| Trigonox C | 1.25 | 1.25 | 1.25 | 1.25 |
| Plasticolors SP-9073 | 0.20 | 0.20 | 0.20 | 0.20 |
| Zinc Stearate | 6.00 | 5.00 | 5.00 | 5.00 |
| Camelwite Calcium Carbonate | 150.00 | 175.00 | 175.00 | |
| Aluminum Trihydrate | | | | 150.00 |
| XAMA-7 | 4.62 | 3.62 | 3.62 | 5.40 |
| 1" Glass Fibers | 93.03 | 95.03 | 95.03 | 89.80 |
| Tensile Strength (MPa) | 65.5 | 82.9 | 69.4 | 59.3 |
| Tensile Modulus (MPa) | 8,550 | 12,962 | 12,066 | 9,170 |
| Tensile Elongation (%) | 1.20 | 1.10 | 1.10 | 1.10 |
| Flexural Strength (Mpa) | 143.6 | 174.2 | 165.6 | 143.2 |
| Flexural Modulus (MPa) | 7,171 | 9,446 | 9,860 | 7,722 |
| Linear shrinkage (mils/inch) [expansion positive] | −0.67 | −1.08 | −0.50 | −0.75 |

TABLE VIII

| Composition | 4 | 5 | 6 | 33 |
|---|---|---|---|---|
| Reichhold 31632 | 100.00 | 60.00 | 100.00 | 60.00 |
| Reichhold 31615-20 | | 40.00 | | |
| Reichhold 31610 | | | | 40.00 |
| Styrene Monomer | 8.00 | 3.00 | | 3.00 |
| BF Goodrich Hycar 1300-X13 | 8.00 | | | |
| Union Carbide Neulon T Plus Modified PVA | | | 40.00 | |
| Ricon Resins 131 MA-17 | | 9.00 | | 9.00 |
| BYK Chemie W-996 | 2.50 | 2.50 | 3.00 | 2.50 |
| General Electric AF-9000 | 0.02 | 0.02 | 0.02 | 0.02 |
| Trigonox 29B75 | 1.00 | 1.00 | 1.00 | 1.00 |
| Plasticolors SP-9139 | 0.25 | 0.25 | 0.25 | 0.25 |
| Zinc Stearate | 5.00 | 5.00 | 5.00 | 5.00 |
| Camelwite | 175.00 | 175.00 | 150.00 | 175.00 |
| XAMA-7 | 0.90 | 1.85 | 0.23 | 1.90 |
| 1" Glass Fibers | 94.95 | 93.99 | 94.58 | 94.00 |
| Tensile Strength (MPa) | 66.6 | 60.7 | 84.9 | 63.2 |
| Tensile Modulus (MPa) | 10,066 | 11,721 | 11,652 | 11,376 |
| Tensile Elongation (%) | 1.20 | 1.20 | 1.40 | 1.10 |
| Flexural Strength (MPa) | 143.0 | 146.2 | 191.2 | 153.1 |
| Flexural Modulus (MPa) | 8,963 | 10,618 | 9,308 | 10,411 |
| Linear shrinkage (mils/inch) [expansion positive] | −1.42 | −1.08 | −1.17 | −1.25 |

TABLE IX

| Composition | 10 | 34 | 35 |
|---|---|---|---|
| Dow Derakane 411-45 | 70.00 | | |
| Dow Derakane 470-36 | | 88.00 | |
| Dow Derakane 780 | 30.00 | 12.00 | |
| Reichhold Atlac 382-ES HMW | | | 50.00 |
| Styrene Monomer | 4.50 | | 50.00 |
| Ricon Resins 131 MA-17 | 13.50 | | |
| Polyurethane Specialties PCA 6-3 | | | 5.51 |
| BYK Chemie W-996 | 2.50 | 2.50 | 2.50 |
| General Electric AF-9000 | 0.02 | 0.02 | 0.02 |
| Trigonox C | 1.25 | | |
| Trigonox 29B75 | | 1.00 | 1.00 |
| Plasticolors SP-9073 | 0.20 | | |
| Plasticolors SP-9139 | | 0.25 | 0.25 |
| Zinc Stearate | 5.00 | 5.00 | 5.00 |
| Camelwite | 175.00 | 200.00 | 175.00 |
| XAMA-7 | 2.80 | 1.12 | 2.04 |
| 1" Glass Fibers | 96.24 | 99.60 | 90.26 |
| Tensile Strength (MPa) | 70.5 | 67.2 | 68.0 |
| Tensile Modulus (MPa) | 11,583 | 7,584 | 9,515 |
| Tensile Elongation (%) | 1.20 | 1.25 | 1.15 |
| Flexural Strength (MPa) | 185.9 | 176.8 | 156.8 |
| Flexural Modulus (MPa) | 10,066 | 9,308 | 8,343 |
| Linear shrinkage (mils/inch) [expansion positive] | −1.83 | −1.25 | −1.67 |

TABLE X

| Composition | 36 | 37 | 38 | 39 |
|---|---|---|---|---|
| Reichhold 31615-20 | 60.00 | | | |
| Alpha Owens Corning E-903 | | 60.00 | | |
| Reichhold Atlac 382-ES HMW | | | 50.00 | 35.00 |
| Reichhold Atlac 382-ES | | | | 15.00 |
| Styrene Monomer | 30.00 | | 50.00 | 50.00 |
| Poly(Styrene/Ethylene-Propylene) Diblock Copolymer | 10.00 | | | |
| Ashland LP-2035 | | 40.00 | | |
| BYK Chemie W-996 | 2.00 | 2.00 | 1.00 | |
| General Electric AF-9000 | 0.02 | 0.02 | 0.02 | |
| Trigonox C | 1.25 | 1.25 | | |
| Trigonox 29B75 | | | 1.00 | 1.00 |
| Plasticolors SP-9073 | 0.20 | 0.20 | | |
| Plasticolors SP-9139 | | | 0.25 | 0.25 |
| Zinc Stearate | 5.00 | 5.00 | 5.00 | 5.00 |
| Camelwite | 150.00 | 175.00 | 80.00 | |
| Plasticolors PG-9033 MgO Dispersion | 0.84 | 0.84 | | |
| XAMA-7 | 1.35 | 1.50 | 2.04 | 2.08 |
| 1" Glass Fibers | 111.71 | 122.49 | 174.75 | 201.18 |
| Tensile Strength (MPa) | 68.6 | 74.5 | 126.4 | 211.5 |
| Tensile Modulus (MPa) | 11,032 | 12,617 | 11,239 | 14,203 |
| Tensile Elongation (%) | 1.00 | 1.10 | 1.40 | 1.80 |
| Flexural Strength (MPa) | 176.8 | 175.3 | 253.9 | 360.7 |
| Flexural Modulus (MPa) | 9,722 | 9,584 | 11,376 | NA |
| Linear shrinkage (mils/inch) [expansion positive] | −0.50 | 0.00 | −0.83 | 0.00 |

TABLE XI

| | Example | | | | | |
|---|---|---|---|---|---|---|
| | 40 | 41 | 42 | 43 | 44 | 45 |
| Aristech MR-14017 | 100.00 | 100.00 | | | | |
| Aristech MR-13017 | | | 60.00 | | | |
| Reichhold 31615-20 | | | | 60.00 | 60.00 | 60.00 |
| Styrene Monomer | 10.00 | 10.00 | 26.00 | | | 30.00 |
| Poly(Styrene/Ethylene-Propylene) Diblock Copolymer | | | | | | 10.00 |
| BF Goodrich Hycar 1300 X-8 | | 10.00 | | | | |
| Alpha Owens Corning RP-700 PMMA | | | | | 40.00 | |
| Union Carbide LP-90 PVA | | | | 40.00 | | |
| Chevron MD-9520 Polystyrene | | | 14.00 | | | |
| BYK Chemie W-996 | 6.00 | 6.00 | 4.5 | 4.5 | 4.5 | 4.5 |
| General Electric AF-9000 | 0.03 | 0.03 | 0.02 | 0.02 | 0.02 | 0.02 |
| Trigonox C | 1.25 | 1.25 | 1.25 | 1.25 | 1.25 | 1.25 |
| Plasticolors SP-9073 | 0.20 | 0.20 | 0.20 | 0.20 | 0.20 | 0.20 |
| Zinc Stearate | 8.00 | 8.00 | 6.00 | 6.00 | 6.00 | 6.00 |
| Camelwite | 300.00 | 300.00 | 300.00 | 300.00 | 300.00 | 300.00 |
| XAMA-7 | 3.25 | 4.00 | 2.17 | | 2.03 | 1.35 |
| XAMA-2 | | | | 3.20 | | |
| Plasticolors PG-9033 | | | | | 0.42 | 0.84 |
| 0.5" Glass Fibers | 75.66 | 77.56 | 73.08 | 73.27 | 73.13 | 73.09 |
| Tensile Strength (MPa) | 36.0 | 30.5 | 26.7 | 22.5 | 25.4 | 29.6 |
| Tensile Modulus (MPa) | 9,653 | 8,274 | 11,790 | 11,928 | 12,549 | 16,065 |
| Tensile Elongation (%) | 0.70 | 0.60 | 0.36 | 0.27 | 0.20 | 0.28 |
| Flexural Strength (MPa) | 88.8 | 82.0 | 90.6 | 77.1 | 93.9 | 95.3 |
| Flexural Modulus (MPa) | 6,205 | 5,861 | 8,481 | 6,964 | 10,135 | 10,066 |
| Linear Shrinkage (mils/inch) [expansion positive] | −3.75 | −0.42 | −1.42 | 0.00 | 0.00 | −0.50 |

TABLE XII

| Composition | C1 | C4 | C5 | C6 | C7 |
|---|---|---|---|---|---|
| Reichhold 31615-20 | 60.00 | 60.00 | | | 60.00 |
| Alpha Owens Corning E-903 | | | 60.00 | 60.00 | |
| Styrene Monomer | 30.00 | | 30.00 | | |
| Poly(Styrene/Ethylene-Propylene) Diblock Copolymer | 10.00 | | 10.00 | | |
| Union Carbide LP-90 PVA | | | | 40.00 | |
| Alpha Owens Corning RP-700 PMMA | | 40.00 | | | 40.00 |
| BYK Chemie W-996 | 2.50 | 2.50 | 3.00 | 3.00 | 2.50 |
| General Electric AF-9000 | 0.02 | 0.02 | 0.02 | 0.02 | 0.02 |
| Trigonox C | 1.25 | 1.25 | 1.25 | 1.25 | 1.25 |
| Plasticolors SP-9073 | 0.20 | 0.20 | 0.20 | 0.20 | 0.20 |
| Zinc Stearate | 5.00 | 5.00 | 5.00 | 5.00 | 5.00 |
| Camelwite | 175.00 | 175.00 | 200.00 | 200.00 | 175.00 |
| Plasticolors PG-9033 MgO Dispersion | 1.68 | 1.68 | 1.68 | 1.68 | |
| Plasticolors PG-91146 Mg(OH)$_2$ | | | | | 3.36 |
| XAMA-7 | | | | | |
| 1" Glass Fibers | 90.21 | 90.21 | 98.26 | 98.26 | 90.74 |
| Tensile Strength (MPa) | 57.4 | 52.3 | 62.2 | 57.1 | 57.9 |
| Tensile Modulus (MPa) | 9,997 | 10,825 | 10,825 | 10,135 | 9,515 |
| Tensile Elongation (%) | 1.10 | 0.90 | 1.10 | 1.10 | 0.80 |
| Flexural Strength (MPa) | 134.6 | 140.7 | 159.7 | 147.2 | 162.1 |
| Flexural Modulus (MPa) | 8,619 | 9,446 | 8,756 | 8,412 | 10,825 |
| Linear shrinkage (mils/inch) [expansion positive] | −0.67 | −0.58 | −0.92 | −0.75 | −0.67 |

| Composition | 11 | 46 | 47 | 48 | 49 |
|---|---|---|---|---|---|
| Reichhold 31615-20 | 60.00 | | | 60.00 | 60.00 |
| Alpha Owens Corning E-903 | | 60.00 | 60.00 | | |
| Styrene Monomer | 30.00 | 30.00 | | | |
| Poly(Styrene/Ethylene-Propylene) Diblock Copolymer | 10.00 | 10.00 | | | |
| Union Carbide LP-90 PVA | | | 40.00 | | |
| Alpha Owens Corning RP-700 PMMA | | | | 40.00 | 40.00 |
| BYK Chemie W-996 | 2.50 | 3.00 | 3.00 | 2.50 | 2.50 |
| General Electric AF-9000 | 0.02 | 0.02 | 0.02 | 0.02 | 0.02 |
| Trigonox C | 1.25 | 1.25 | 1.25 | 1.25 | 1.25 |
| Plasticolors SP-9073 | 0.20 | 0.20 | 0.20 | 0.20 | 0.20 |
| Zinc Stearate | 5.00 | 5.00 | 5.00 | 5.00 | 5.00 |
| Camelwite | 175.00 | 200.00 | 200.00 | 175.00 | 175.00 |
| Plasticolors PG-9033 MgO Dispersion | 0.84 | 0.84 | 1.26 | 0.42 | |
| Plasticolors PG-91146 Mg(OH)$_2$ | | | | | 1.68 |
| XAMA-7 | 1.35 | 1.50 | 0.75 | 2.03 | 1.44 |
| 1" Glass Fibers | 90.37 | 98.47 | 98.36 | 90.45 | 90.66 |
| Tensile Strength (MPa) | 69.8 | 72.8 | 62.8 | 64.3 | 67.5 |
| Tensile Modulus (MPa) | 12,411 | 13,031 | 11,997 | 11,514 | 12,135 |
| Tensile Elongation (%) | 1.20 | 1.20 | 1.10 | 1.00 | 1.10 |
| Flexural Strength (MPa) | 167.1 | 159.1 | 156.9 | 166.3 | 170.2 |
| Flexural Modulus (MPa) | 9,584 | 9,584 | 8,619 | 10,411 | 10,963 |
| Linear shrinkage (mils/inch) [expansion positive] | −0.58 | −0.92 | −0.33 | −0.08 | −0.33 |

TABLE XIII

| Composition | 50 | 51 | 52 | 53 | 54 |
|---|---|---|---|---|---|
| Shell Epon 828 Epoxy Resin | 85.00 | 85.00 | 45.00 | | |
| Ciba-Geigy AroCy L-10 Resin | | | 50.00 | 90.00 | |
| DSM Daron XP-21-102 | | | | | 100.00 |
| BF Goodrich Hycar 1300-X13 | 15.00 | | | | |
| BF Goodrich Hycar 1300-X18 | | 15.00 | 5.00 | 10.00 | |
| Ricon Resins 131 MA-12 | | | | | 16.00 |
| XAMA-7 | 1.11 | 1.35 | 0.45 | 0.90 | 2.40 |

An advantage of this invention is that compounds can be thickened rapidly to reach a stable viscosity plateau that can be adjusted by formulation. The rate of viscosity increase prior to reaching the plateau can also be controlled. The result is that molding compounds thickened by this method remain soft and pliable and have an extended shelf life. Another advantage is that the thickening reaction occurs at ambient conditions without the need for a catalyst that may promote premature crosslinking. Another advantage is that improved glass wet out is realized due, in part, to viscosity control. Another advantage is that the thickening reaction is not inhibited by the presence of water. Another advantage of this method is that it is a general approach that can be applied to a number of different thermoset resins. This provides a great deal of latitude for the development of sheet molding compounds, bulk molding compounds, thick molding compounds, and the like from thermoset resins that may be unthickenable using prior art practices.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for making a thickened thermoset resin composition for molding materials, comprising: mixing
   (A) a thermoset resin composition, wherein said thermoset resin composition comprises at least one of a poly(ester-imide) resin, an epoxy resin, a vinyl ester resin that is a reaction product of an epoxy resin and a monofunctional ethylenically unsaturated carboxylic acid, and a bisphenol A fumarate resin, and the thermoset resin composition optionally contains an amine acceptor; and (B) at least one compound represented by the formula (B-I)

wherein in Formula (B-I): $R^1$, $R^2$, $R^3$ and $R^4$ are independently hydrogen or methyl; $R^5$ is hydrogen, a hydrocarbon group or a substituted hydrocarbon group, the substituent on said substituted hydrocarbon group is at least one selected from the group consisting of hydroxy, alkoxy, aziridinyl and ester groups; and n is at least 1.

2. The process of claim 1 wherein at least one metal oxide or hydroxide (C) is used in combination with (B), the metal in said oxide or hydroxide being selected from the group consisting of Mg, Ca, Zn, and mixtures of two or more thereof.

3. The process of claim 1 wherein (A) further comprises at least one carboxylic acid or anhydride.

4. The process of claim 1 wherein (A) comprises a thermoset resin having a carboxylic acid group forming a part of its molecular structure.

5. The process of claim 1 wherein (A) further comprises at least one carboxylic acid.

6. The process of claim 1 wherein said thermoset resin in (A) is a carboxylic acid containing bisphenol A fumarate resin.

7. The process of claim 1 wherein (A) further comprises an oligomeric or polymeric material having in its molecular structure at least one carboxylic acid group.

8. The process of claim 1 wherein (A) further comprises acrylic acid, methacrylic acid, maleic acid or anhydride, succinic anhydride, phthalic acid or anhydride, isophthalic acid, terephthalic acid, adipic acid, polyadipic anhydride, a fatty acid, or a mixture of two or more thereof.

9. The process of claim 1 wherein the resin composition (A) further comprises a free radical initiator, polymerization inhibitor, pigment, thermoplastic polymeric material, wetting agent, antifoam agent, mold release agent, filler, fibrous reinforcing material, or a mixture of two or more thereof.

10. The process of claim 1 wherein (B) is a compound represented by the formula (B-II)

wherein in Formula (B-II), $R^1$ is an alkylene group, $R^2$ is a hydrocarbyl group or a substituted hydrocarbyl group, wherein the substituted group is at least one selected from the group consisting of hydroxy, alkoxy and ester groups, and $R^5$ is a hydrogen or methyl group.

11. The process of claim 1 wherein (B) is a compound represented by the formula (B-III)

wherein in Formula (B-III), $R^1$ and $R^2$ are alkylene groups, $R^3$ is hydrogen, a hydrocarbyl group or a substituted hydrocarbyl group, wherein the substituted group is at least one selected from the group consisting of hydroxy, alkoxy and ester groups, $R^5$ is a hydrogen or methyl group, and n is a number in the range of 2 to 4.

12. The process of claim 1 wherein (B) is a compound represented by the formula (B-IV)

wherein in Formula (B-IV) $R^1$ is $-C_2H_5$ or $-CH_2OH$, and $R^5$ is a hydrogen or methyl group.

13. A process for making a thickened thermoset resin composition for molding materials, comprising: mixing (A) a thermoset resin composition comprising at least one of a poly(ester-imide) resin, an epoxy resin, a vinyl ester resin that is a reaction product of an epoxy resin and a monofunctional ethylenically unsaturated carboxylic acid, and a bisphenol A fumarate resin; and (B) a compound comprising at least two aziridine rings.

14. The process of claim 13 wherein at least one metal oxide or hydroxide (C) is used in combination with (B), the metal in said oxide or hydroxide being selected from the group consisting of Mg, Ca, Zn, and mixtures of two or more thereof.

15. The process of claim 13 wherein component (A) further comprises an amine acceptor.

16. The process of claim 15 wherein component (B) is at least one selected from the group consisting of a trimethylol propane-tris (beta-(N-aziridinyl) proprionate) and a pentaerythritol-tris-(beta-(aziridinyl) propionate).

17. A process for making a thickened thermoset composition for molding materials, comprising: mixing (A) a thermoset resin composition comprising at least one of a poly(ester-imide) resin, an epoxy resin, a vinyl ester resin that is a reaction product of an epoxy resin and a monofunctional ethylenically unsaturated carboxylic acid, and a bisphenol A fumarate resin; and (B) a compound represented by the formula (B-IV)

wherein in Formula (B-IV) $R^1$ is $-C_2H_5$ or $-CH_2OH$, and $R^5$ is a hydrogen or methyl group.

* * * * *